March 22, 1960     E. W. SCHELLENTRAGER     2,929,604
INDICATOR MEANS FOR ADJUSTABLE TRIP ON A WEIGHING MECHANISM
Filed Jan. 31, 1955     2 Sheets-Sheet 1

INVENTOR.
EUGENE W. SCHELLENTRAGER
BY
Hyde, Meyer, Baldwin & Doran
ATTORNEYS

March 22, 1960    E. W. SCHELLENTRAGER    2,929,604
INDICATOR MEANS FOR ADJUSTABLE TRIP ON A WEIGHING MECHANISM
Filed Jan. 31, 1955            2 Sheets-Sheet 2

INVENTOR.
EUGENE W. SCHELLENTRAGER
BY Hyde, Meyer, Baldwin & Doran
ATTORNEYS

United States Patent Office 2,929,604
Patented Mar. 22, 1960

2,929,604

INDICATOR MEANS FOR ADJUSTABLE TRIP ON A WEIGHING MECHANISM

Eugene W. Schellentrager, Shaker Heights, Ohio, assignor to The Atlas Bolt & Screw Company, Cleveland, Ohio, a corporation of Ohio Application January 31, 1955, Serial No. 485,224

9 Claims. (Cl. 249—2)

This invention relates to improvements in an indicator means and more particularly to an indicator means for an adjustable trip on a weighing mechanism.

One of the objects of the present invention is to provide an indicator means having a pointer portion adjustable along a predetermined arc with respect to a supporting arm.

A further object of the present invention is to provide a movable scale pointer, an arm movable along the same path, and a pointer carried by the arm and adjustable relative thereto along the same path while maintaining generally the same orientation at all times with respect to the scale pointer when coinciding therewith.

A further object of the present invention is to provide an arm having means responsive to alignment generally of a scale pointer therewith for controlling the flow of material being weighed on said scale with said arm having an indicator pointer adjustable with respect thereto to determine the estimated final stopping place of the scale pointer after flow stops with the pointer portion having generally the same orientation as the scale pointer at that time.

A further object of the present invention is to provide an adjustable indicator construction characterized by its structural simplicity, ease of assembly, its operating efficiency, and its inexpensive manufacturing cost.

Other features of this invention reside in the arrangement and design of the parts for carrying out their appropriate functions.

Other objects and advantages of this invention will be apparent from the accompanying drawings and description and the essential features will be set forth in the appended claims.

Figure 2:
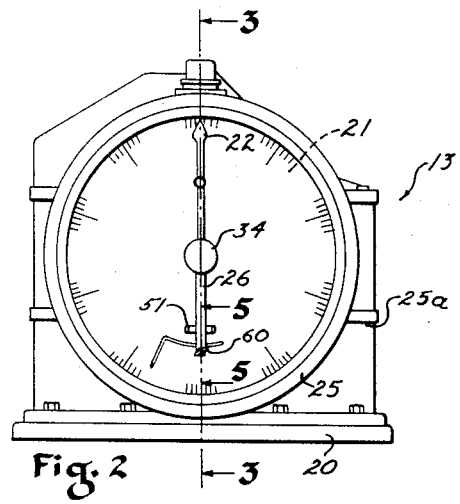
Fig. 2 is an enlarged front elevational view of the scale in Fig. 1 having the present invention included therein but with control wires removed.
Figure 7:
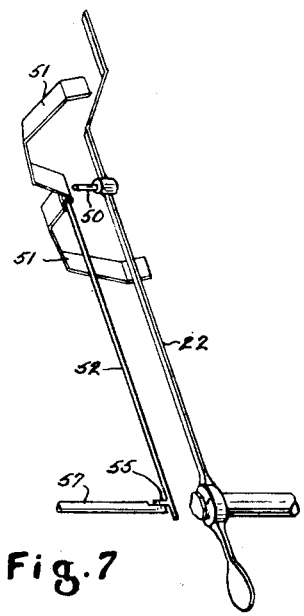
Figure 4:
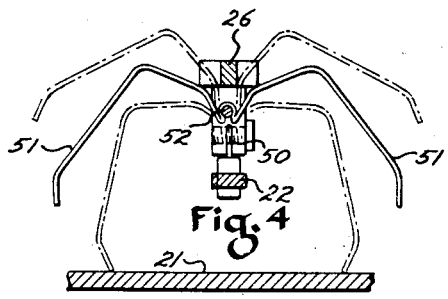
Figure 5:
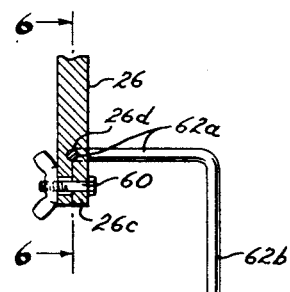
Figure 6:
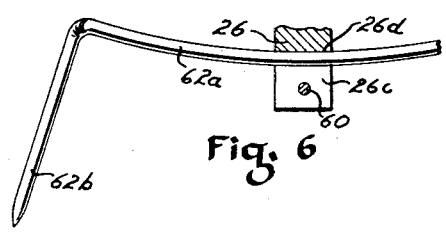
Figure 3:
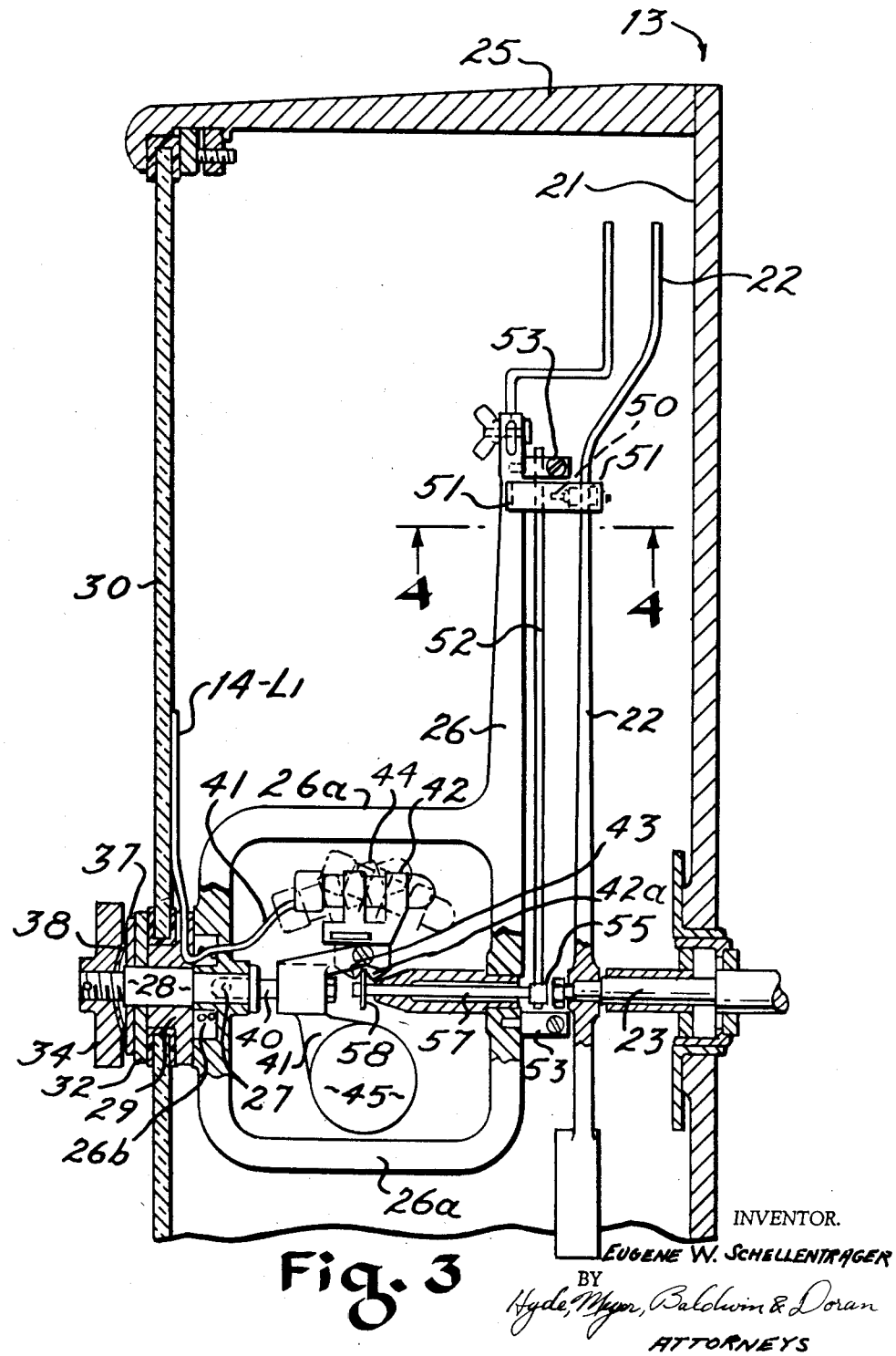
Fig. 3 is a vertical sectional view taken along the line 3—3 of Fig. 2 but with the control arm swung around 180° to the vertical position for simplicity of illustration, with the control wires cut off, and with a butterfly type trip member, switch and connecting parts in an intermediate position.

Fig. 4 is a horizontal sectional view taken along the line 4—4 of Fig. 3 of the butterfly type trip member in a solid line intermediate position and in two extreme dot-dash line positions as the scale pointer approaches it from the zero position and after the scale pointer has moved past it but has not returned sufficiently far toward the zero position to move the trip member back to the opposite dot-dash line position;

Fig. 5 is a vertical sectional view taken along the line 5—5 of Fig. 2 to disclose the indicator means in more detail; while Fig. 6 is a vertical sectional view taken along the line 6—6 of Fig. 5 through the indicator means and supporting arm therefor while Fig. 7 is a perspective view of a portion of some of the parts in Fig. 3 removed from the surrounding structure.

Before the structure here illustrated is specifically described, it is to be understood that the invention here involved is not limited to the structural details or arrangement of parts here shown since structures embodying the present invention may take various forms. It is also to be understood that the phraseology or terminology herein employed is for purposes of description and not of limitation since the scope of the present invention is denoted by the appended claims.

Figure 1:
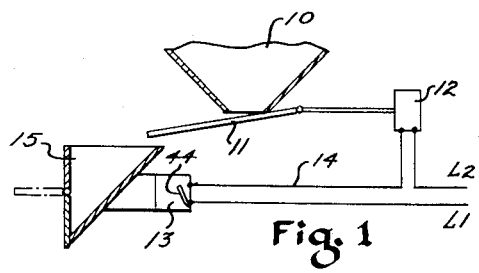
Fig. 1 is a schematic view of a scale, having the present invention, for weighing the material dispensed from a material supply hopper along a vibrating feeder into a scale hopper to control the flow therebetween.

While this invention might be adapted to various uses, I have chosen to show the same as applied to a scale and more particularly to a scale used in a material flow control of the type shown in Fig. 1. The material supply hopper 10 in Fig. 1 is adapted to feed material by gravity or in any other suitable manner to a scale hopper 15 with the weight of material therein indicated by scale 13. The material flow can be controlled by any suitable dispenser flow control but is herein shown as a feeder 11, such as a feeder trough, vibrated by a motor 12. After a predetermined weight of material is in the scale hopper 15, the power to the motor, normally supplied electrically through lines L1, L2 and 14, is cut off by opening a suitable switch in the scale 13 to be described more in detail hereinafter and later designated switch 44. After power to motor 12 is cut off, material dribble may still occur from the discharge end of feeder 11 to change the total weight in scale hopper 15 with this quantity of dribble being dependent on many factors including the characteristics of the material being dispensed and the material flow angle on feeder 11. The present invention is primarily directed to an indicator means adjustable relative to this power cutoff to indicate in an easily readable fashion over a wide extent of adjustment the estimated final stopping place of the scale pointer after flow stops so that the final weight of scale hopper 15 can be accurately predetermined.

Although any suitable scale 13 and flow cutoff mechanism may be used, the following description discloses a scale and power cutoff switch thereon suitable for this purpose. Scale 13 includes a housing 20 having a circular scale dial 21 thereon with circumferentially arranged graduations of any suitable numerical value equally spaced around a circle, such as a maximum weight of 10,000 pounds in 25 pound graduations. Scale pointer 22 is mounted on a rotatable shaft 23 of housing 20 driven by any suitable weighing mechanism responsive to the weight in hopper 15 and mounted axially of said graduations in the center of the circle formed thereby so as to be movable over the dial to indicate the weight of material in hopper 15.

Scale 13 includes a flow control arm 26 carrying the power cut off switch and adjustable throughout the full arcuate extent of the scale dial 21. The front of housing 20 and scale dial 21 is adapted to be protected by a cover member 25 movably connected to housing 20 in any suitable manner, such as by hinges 25a in Fig. 2. Within the hollow cover 25 and entirely supported thereby independently of direct connection to the scale housing 20 are the adjustable flow control arm 26 and the power cutoff switch carried thereby. Flow control arm 26 is integral with an open central framework or bracket 26a, which bracket is attached to shaft 28 and shaft extension 40 by pin 27 with this shaft rotatably mounted coaxially with shaft 23 in bearing 29 supported by a transparent window 30, such as a glass plate, mounted over the front of scale dial 21 as the front face of cover member 25. Bearing 29 is secured to window 30 by bearing plate 32 secured in any suitable manner to the bearing 29, such as by a plurality of screws. Arm adjusting knob 34 is threaded onto the outer end of shaft 28 until there is sufficient tension in spring washer 38 to hold knob 34 and arm 26 in any adjusted position by friction and then knob 34 is fixed in any suitable manner to shaft 28. A wear washer 37 is located between spring washer 38 and plate 32 to permit relative rotation therebetween. Hence, rotatable knob 34 serves as an actuator for rotating adjustable control arm 26 along a circular path coaxial with and substantially parallel to the path of scale pointer 22 even when cover 25 is in its closed position since knob 34 extends to a point outside of this cover member.

Means is provided on this control arm 26 responsive to the alignment of scale pointer 22 generally therewith for controlling the flow of the material being weighed in scale hopper 15 with this means including specifically herein a power cutoff switch for stopping vibrating feeder motor 12 in Fig. 1. Shaft 28 in Fig. 3 has extension shaft 40 secured thereto by pin 27 with a switch supporting frame 41 rotatably mounted on the right end of shaft extension 40. A switch cradle 42 is pivotally mounted to frame 41 by pivot pin 43 extending at right angles to shafts 23 and 28 and has secured thereto a mercury switch 44 to permit swinging the switch to one or the other illustrated extreme dot-dash line positions for opening or closing the circuit. Counterweight 45 on frame 41 counterbalances switch 44 so as to always hold it in the Fig. 3 position (vertical) regardless of the angular position of control arm 26. Electrical wires L1, 14 in Figs. 1 and 3 are looped around shaft 28 in annular recess 26b, to permit full 360 degree rotation of control arm 26, before these wires travel up the inside face of window 30 and out of scale 13.

This means also includes mechanism for operating the switch 44 by automatically moving it to either open or closed position, whichever position is desired. First, switch 44 is opened by suitable mechanism. Trip pin 50 on scale pointer 22 is adapted to actuate switch 44 by tilting it to an extreme position as the scale pointer moves generally into alignment with the control arm while indicating the material weight in scale hopper 15. Pin 50 on scale pointer 22 in Figs. 3 and 4 is adapted to cam against "butterfly type" trip member 51 fastened to shaft 52 with said shaft rotatably mounted in bearings 53 in Fig. 3 on and carried by arm 26. The actuation of trip member 51 by pin 50 carried by pointer 22 should be readily apparent. Trip member 51 is of the "butterfly type" with two diverging arms secured to the shaft 52. Assume for the start of this discussion that the left arm of trip member 51 is in the lower position in Fig. 4 and the right arm is in the upper position, as shown by dot-dash lines. Then, as the trip pin 50 moves horizontally from the right toward the left, it will clear the elevated right arm and then later engage the lowered left arm. As the trip pin 50 moves further to the left, arm 51 will be swung clockwise with shaft 52 until the right arm is in the lowered position and the left arm is in the raised position illustrated by the dot-dash line in Fig. 4 so that pin 50 can move to the left past and under the raised left arm of trip member 51. As the trip pin 50 moves from the left toward the right in its return travel, trip member 51 and shaft 52 will be oscillated counterclockwise back to their original position shown in dot-dash lines in Fig. 4 with the left arm in the lowered position and the right arm in the elevated position so that pin 50 can clear the distal end of the right arm. Oscillation of shaft 52 swings crank 55, secured to said shaft and located near the axis of rotation of shaft 28, so as to push by crank 55 axially plunger 57, located coaxially with shaft 28. Endwise movement of plunger 57 moves disk 58 in Fig. 3 secured thereto in an axial direction. Since disk 58 is straddled by two switch cradle lips 42a carried by cradle 42, this axial movement of disk 58 engages one of the lips 42a to swing lips 42a about pivot pin 43 to pivot switch cradle 42 and mercury switch 44 about pivot pin 43 to the opposite tilted dot-dash line position in Fig. 3 so as to open this switch. Disk 58 is circular in form so as to be able to engage lips 42a similarly in any angular position of flow control arm 26. As switch 44 begins to tilt, and the mercury pool flows past its center of gravity balance, further movement of the switch to its final tilted position is aided by the flow of the mercury toward the low end of the switch bulb and thus relieves scale pointer 22 of any load immediately after it trips the switch and just before it completes its weight indicating movement. Opening switch 44 in scale 13 deenergized feeder motor 12 to stop feeder 11. Switch 44 remains in its circuit open position until the load has been dumped from the scale hopper 15. Second, switch 44 is closed by the same mechanism. During dumping, pin 50 on scale pointer 22, while returning to zero, cams against the other arm of the trip member 51 to reverse the mode of operation of these aforementioned component parts (such as reverse of the aforementioned direction of movement of member 51, shaft 52, crank 55, plunger 57, disk 58, cradle 42 and switch 44 with the other lip 42a being engaged by disk 58) and thus close mercury switch 44 and start vibrating feeder motor 12 (after an appropriate time delay, if desired, caused by an appropriate time delay means in the circuit to prevent discharge from bin hopper 10 before the dump gate of scale hopper 15 is closed) to repeat the dispensing and weighing operations.

The butterfly design of trip member 51 not only provides time delay in the mercury switch tilt before the switch can be tilted back but also automatically locates trip member 51, if misaligned, in the right position when cover member 25 is closed since one of the distal ends thereof will engage against the scale dial face 21 during closing because of its long length.

Knob 34 permits setting the flow control arm 26 at any desired angular position so that the mercury switch 44 will be tripped at the proper time by scale pointer 22 to accurately control the weight of material dispensed from hopper 10 along feeder 11 vibrated by motor 12 into scale hopper 15. However, since material dribble still occurs after motor 12 has been deenergized by switch 44, it has been found desirable to provide an indicator means adjustably mounted on arm 26 for determining the estimated final stopping place of scale pointer 22 after the flow stops. The indicator means illustrated herein is specifically designed for easy and accurate reading over a large range of adjustment.

This indicator means includes an adjustable clamp means at the distal end of control arm 26 including a slot 26c having a hole or recess 26d at its inner end formed from said arm with a thumb nut and bolt clamp 60 for squeezing together the opposite walls of the slot 26c and constricting the size of the hole or recess 26d. Adjustably clamped in recess 26d is a wire including an arcuate supporting portion 62a having a radius of curvature with a center coaxial with the axis of rotation of scale pointer 22 and of arm 26 and including a radially extending indicator pointer portion 62b integral therewith for indicating the estimated final stopping place of scale pointer 22 after the flow stops. This adjustable indicator means permits compensation for delay in switch operation or in motor stopping after scale pointer 22 is accurately registered with control arm 26.

The distal or outer pointed end of pointer 62b moves through an arc of constant radius throughout its adjustment travel with respect to arm 26 with this arc being centered coaxially with the axis of rotation of pointer 22 and arm 26. Hence, the tip of pointer 62b is located a uniform distance from the scale graduations and oriented similarly to scale pointer 22 with respect to the graduations on scale dial 21 with the straight portion of pointer 62b extending radially of the axis of shaft rotation, generally perpendicular to the path of travel of scale pointer 22 and control arm 26, and parallel to the scale dial graduation through its whole adjustment travel relative to control arms 26. The arcuately shaped supporting portion 62a is preferably of sufficient length so that the pointer is adjustable through at least 500 pounds or an 18 degree arc on a 10,000 pound scale to compensate for the dribble characteristics of most different types of materials and vibrating screens encountered. Since pointer portion 62b is always located a uniform distance from the scale dial graduations and is always pointing radially toward a scale dial graduation, it is easy and accurate to read and is easy to set under all conditions.

Since the quantity of dribble is approximately constant for any given material and feeder, pointer 22 may be accurately set and then the wing nut of the clamp bolt assembly 60 tightened. After cover 25 is closed, knob 34 can be used for accurately setting instantly control arm 26 from outside of the scale housing by any scale operator of any reasonable intelligence level. The scale mechanism is always protected from dust by the closed cover member 25. Cover member 25 supports all of the component parts to eliminate any supporting members tending to obstruct graduations on the scale dial and thus prevent easy and accurate reading, and to support the component parts in an exposed position for repair, adjustment, etc. when cover member 25 is swung to its open position.

This indicator construction shown in Figs. 5 and 6 can be used in other constructions in addition to those shown in Fig. 1. For example, it can accurately control the flow of material into or out of the scale hopper 15 through any type dispensing or flow cutoff closure construction instead of vibrating feeder 11.

Various changes in details and arrangement of parts can be made by one skilled in the art without departing from either the spirit of this invention or the scope of the appended claims.

What is claimed is:

1. In a scale for weighing and controlling material flow from a material feeding means with said scale having a scale dial with graduations thereon and having a scale pointer movable thereover, an adjustable arm movable along a path substantially parallel to the path of said scale pointer, means on said arm responsive to alignment of said scale pointer generally therewith for controlling the flow of material being weighed, and indicator means carried by said arm, said indicator means including an indicator pointer portion coacting with said graduations and adjustable along said path of travel with respect to said arm to determine the estimated final stopping place of said scale pointer after flow stops, said indicator portion being located a uniform distance from and similarly oriented with respect to said graduations throughout its adjustment travel.

2. In a scale for weighing and controlling material flow from a material feeding means with said scale having a scale dial with graduations thereon and having a scale pointer movable thereover, an adjustable arm movable along a path substantially parallel to the path of said scale pointer, means on said arm responsive to alignment of said scale pointer generally therewith for controlling the flow of material being weighed, and indicator means carried by said arm, said indicator means including an indicator pointer portion coacting with said graduations and adjustable along said path of travel with respect to said arm to determine the estimated final stopping place of said scale pointer after flow stops, said indicator portion being formed by a straight portion extending generally perpendicular to the line of travel throughout its adjustment travel.

3. In a scale for weighing and controlling material flow from a material feeding means with said scale having a scale dial with graduations thereon and having a scale pointer movable thereover, an adjustable arm movable along a path substantially parallel to the path of said scale pointer, means on said arm responsive to alignment of said scale pointer generally therewith for controlling the flow of material being weighed, and indicator means carried by said arm, said indicator means including an indicator pointer portion coacting with said graduations and adjustable along said path of travel with respect to said arm to determine the estimated final stopping place of said scale pointer after flow stops, said indicator portion being located a uniform distance from and similarly oriented with respect to said graduations and being formed by a straight portion extending generally perpendicular to the line of travel and parallel to the graduations throughout its adjustment travel.

4. In a scale for weighing and controlling material flow from a material feeding means with said scale having a circular scale dial with circumferentially arranged graduations thereon and having a scale pointer mounted axially thereof and movable thereover, an adjustable arm mounted coaxially with said scale pointer and movable along a coaxial circular path, means on said arm responsive to alignment of said scale pointer generally therewith for controlling the flow of material being weighed, and indicator means carried by said arm, said indicator means including an indicator pointer portion coacting with said graduations and adjustable along said path of travel with respect to said arm to determine the estimated final stopping place of said scale pointer after flow stops, said indicator portion being located a uniform distance from and similarly oriented with respect to said graduations throughout its adjustment travel.

5. In a scale for weighing and controlling material flow from a material feeding means with said scale having a circular scale dial with circumferentially arranged graduations thereon and having a scale pointer mounted axially thereof and movable thereover, an adjustable arm mounted coaxially with said scale pointer and movable along a circular path substantially parallel to the path of said scale pointer, means on said arm responsive to alignment of said scale pointer generally therewith for controlling the flow of material being weighed, and indicator means carried by said arm, said indicator means including an arcuate supporting portion and a radially extending indicator pointer portion, said indicator pointer portion coacting with said graduations and being adjustable through a generally coaxial arc along said path of travel with respect to said arm to determine the estimated final stopping place of said scale pointer after flow stops.

6. In a scale for weighing and controlling material flow from a material feeding means with said scale having a circular scale dial with circumferentially arranged graduations thereon and having a scale pointer mounted axially thereof and movable thereover, an adjustable arm mounted coaxially with said scale pointer and movable along a coaxial circular path, means on said arm responsive to alignment of said scale pointer generally therewith for controlling the flow of material being weighed, and indicator means carried by said arm, said indicator means including an indicator pointer portion coacting with said graduations and adjustable through at least an 18° generally coaxial arc along said path of travel with respect to said arm to determine the estimated final stopping place of said scale pointer after flow stops.

7. In a scale for weighing and controlling material flow from a material feeding means with said scale having a circular scale dial with circumferentially arranged graduations thereon and having a scale pointer mounted axially thereof and movable thereover, an adjustable arm mounted coaxially with said scale pointer and movable along a coaxial circular path, means on said arm responsive to alignment of said scale pointer generally therewith for controlling the flow of material being weighed, and indicator means carried by said arm, said indicator means including an adjustable clamp means on said arm and including an arcuate supporting portion and a radially extending indicator pointer portion with said portions formed integrally from a single piece of wire, said indicator pointer portion coacting with said graduations and being adjustable through an arc with respect to said arm.

8. In a scale for weighing and controlling material flow from a material feeding means with said scale having a housing with a circular scale dial with circumferentially arranged graduations thereon and having a scale pointer mounted axially thereof and movable thereover, cover for said dial and scale pointer movably connected to said housing, an adjustable arm mounted coaxially with said scale pointer and movable along a circular path substantially parallel to the path of said scale pointer, an actuator for said arm extending to a point outside of said cover, means on said arm responsive to alignment of said scale pointer generally therewith for controlling the flow of material being weighed, and indicator means carried by said arm, said indicator means including an adjustable clamp means on said arm and including an arcuate supporting portion and a radially extending indicator pointer portion with said portions formed integrally from a single piece of wire, said indicator pointer portion coacting with said graduations and being adjustable through at least an 18° generally coaxial arc along said path of travel with respect to said arm to determine the estimated final stopping place of said scale pointer after flow stops, said indicator portion being located a uniform distance from and similarly oriented with respect to said graduations and extending generally perpendicular to the line of travel and parallel to the graduations throughout its adjustment travel.

9. An indicator structure for a pointer movable through an arcuate path with respect to arcuately arranged indicia, comprising, an arm in this arcuate path and coactable with said pointer for control purposes, and indicator means carried by said arm, said indicator means including an adjustable clamp means on said arm and including an arcuate supporting portion detachably securable by said clamp means and a radially extending indicator pointer portion for coacting with the indicia and with said portions formed integrally from a single piece of wire, said indicator pointer portion being adjustable through an arc with respect to said arm and clampable in any position by changing the position of said clamp means and said supporting portion.

References Cited in the file of this patent

UNITED STATES PATENTS

| | | |
|---|---|---|
| 2,348,372 | Weckerly | May 9, 1944 |
| 2,605,737 | Brown et al. | Aug. 5, 1952 |